United States Patent

Engel

[11] Patent Number: 5,999,117
[45] Date of Patent: Dec. 7, 1999

[54] METHOD FOR TRACKING AND DETECTING TURNS OF MANEUVERING TARGETS

[75] Inventor: Stephen Joseph Engel, East Northport, N.Y.

[73] Assignee: Northrop Grumman Corporation, Los Angeles, Calif.

[21] Appl. No.: 09/098,250

[22] Filed: Jun. 16, 1998

[51] Int. Cl.[6] .............................. G01S 13/58; G01S 13/66
[52] U.S. Cl. .......................... 342/95; 342/105; 342/114; 342/115
[58] Field of Search .................... 342/95, 96, 97, 342/105, 107, 110, 114, 115, 135, 136, 140, 195

[56] References Cited

U.S. PATENT DOCUMENTS

| | | | |
|---|---|---|---|
| 3,803,602 | 4/1974 | Case et al. | 342/105 |
| 3,952,304 | 4/1976 | Broniwitz et al. | 342/95 |
| 3,996,590 | 12/1976 | Hammack | 342/465 |
| 4,011,563 | 3/1977 | Robbi | 343/7 |
| 4,060,809 | 11/1977 | Baghdady | 342/451 |
| 4,148,029 | 4/1979 | Quesinberry | 343/9 |
| 4,158,840 | 6/1979 | Schwab | 342/52 |
| 4,163,975 | 8/1979 | Guilhem et al. | 343/16 |
| 4,175,285 | 11/1979 | Dansac et al. | 364/456 |
| 4,179,696 | 12/1979 | Quesinberry et al. | 342/75 |
| 4,241,350 | 12/1980 | Uffelman | 343/5 |
| 4,649,390 | 3/1987 | Andrews et al. | 342/140 |
| 4,891,762 | 1/1990 | Chotiros | 364/456 |
| 5,187,777 | 2/1993 | Conboy et al. | 395/163 |
| 5,214,433 | 5/1993 | Alouani et al. | 342/95 |
| 5,218,648 | 6/1993 | Wells et al. | 382/34 |
| 5,313,212 | 5/1994 | Ruzicka | 342/101 |
| 5,325,098 | 6/1994 | Blair et al. | 342/95 |
| 5,341,143 | 8/1994 | Reis et al. | 342/64 |
| 5,396,252 | 3/1995 | Kelly | 342/94 |
| 5,431,142 | 7/1995 | Reis et al. | 342/64 |
| 5,479,360 | 12/1995 | Seif et al. | 364/516 |
| 5,525,995 | 6/1996 | Benner | 342/90 |
| 5,631,653 | 5/1997 | Reedy | 342/62 |
| 5,689,274 | 11/1997 | Rose | 342/417 |

*Primary Examiner*—John B. Sotomayor
*Attorney, Agent, or Firm*—Terry J. Anderson; Karl J. Hoch, Jr.

[57] ABSTRACT

A method for detecting and tracking turns of a maneuvering target comprises the steps of determining first and second radar information of the maneuvering target. The first and second radar information and a set of target speeds are used to determine a set of turn radii for the maneuvering target. The first and second radar information and a set of target arc speeds are used to determine a second set of turn radii for the maneuvering target. The set of turn radii and the set of target speeds define a speed-radius curve, and the second set of turn radii and the set of target arc speeds define an arc speed-radius curve. An intersection of the speed-radius and arc speed-radius curves is located, and the intersection is used to determine whether the maneuvering target has made a turn.

15 Claims, 1 Drawing Sheet

METHOD FOR TRACKING AND DETECTING TURNS OF MANEUVERING TARGETS

FIELD OF THE INVENTION

The invention relates to radar tracking of maneuvering targets, and more particularly to a method for detecting turns made by a maneuvering target.

BACKGROUND OF THE INVENTION

Many existing radar systems have the ability to track targets. A common method for tracking targets involves using a tracking filter to provide estimates of a target's future behavior. As new radar information is received, it is associated with a particular target's track based on the degree to which the information matches an estimate from the filter. Each position estimate from the filter has an associated area of interest, or gate, around it. The size of the gate is determined by the error tolerance of the radar measurements. Radar reports in a gate are associated with an existing target track based on the closeness of the report to the filter's estimate. A Kalman filter is often used as the tracking filter in existing systems. This method is adequate for tracking targets with straight line trajectories.

Data association tracking based upon model estimation has a high computational burden. Models operate under the assumption that the past behavior of a target is an indicator of future behavior. If a target is moving along a straight line, then makes an unanticipated turn, the model extrapolates an estimated position for the target further along the straight line. If the model is designed to recover from this type of turn, it must have a search window, or gate, large enough to include the target after the turn. In the next radar scan, since the target is not where the model expected it to be and there may be a possibility that the target was not detected, the model extrapolates another expected position along the straight line. With each successive radar scan, the error between the estimated position and the true position of the target grows, and the search window area required to recover the target grows as the square of the model error. Many more radar returns must be evaluated to determine if they fit any trajectory model. The number of track possibilities grows exponentially as the number of scans increases. This imposes a high computational burden on the radar tracking system. There is a need for a method for detecting and tracking maneuvering targets that has a much more modest computational burden.

In present tracking methods, maneuvering targets may never initiate tracks, while others may initiate tracks without sufficient characterization for track following. Targets having shallow weave trajectories may be initialized as straight line trajectories with poor tracking qualities. Targets having deep weave trajectories may be initialized as arcs, also with poor tracking qualities. Targets with intermediate weave trajectories may never initiate tracks in these methods. If a weave trajectory is initialized as a line or arc with large filter errors, it may be passed on to another method that can extract maneuver parameters such as period, amplitude, phase, or heading. These parameters may be used to characterize a weave model so that predictions and subsequent data association may be made for track following. Each of these maneuver parameters adds an additional computational burden to the model. There is a need for a method for tracking maneuvering targets that locates targets having intermediate weave trajectories and does not require complete model characterization.

One method for detecting maneuvering targets, as disclosed in U.S. Pat. No. 5,124,433 to Alouani et al., detects a target's maneuver by measuring the magnitude of residuals, or deviations from expected values, for a constant velocity filter. In this method, a certain amount of filter error is taken as an indication that the target has made a maneuver. Producing the residuals is very costly in terms of computational time. This method may detect maneuvers, but it has a high computational burden.

When tracking a maneuvering target, degradation of the performance of a Kalman filter can be severe, especially in acceleration estimates. A solution to this problem has been proposed by Ruzicka in U.S. Pat. No. 5,313,212. Ruzicka provides a post processor to correct the outputs of a Kalman filter for bias errors. This bias correction does improve the estimates of the filter, but the correction involves complicated calculations in line of sight (LOS) coordinates. This method improves the performance of Kalman filter based trackers, but it does nothing to ease the computational burden of detecting and tracking maneuvering targets. There is a need for a method for tracking maneuvering targets that does not depend on Kalman filters.

In U.S. Pat. No. 5,631,653, Reedy discloses a system and method for detecting maneuvers, which gathers observed data in aircraft-relative coordinates, and then transforms the data into observation-relative inertial coordinates before comparing the data to estimates based on the target's past behavior. This method involves vector calculations in at least two different coordinate systems, and predicts a target's future behavior based on its past behavior. There is a need for a method for tracking maneuvering targets that does not predict a target's behavior based on its past behavior.

It is an object of the present invention to provide a maneuver detection method that is computationally simpler than existing maneuver detectors, and does not depend on the use of a conventional tracking filter.

It is a further object of the present invention to provide a maneuver detection method that does not use target information that is defined by a particular coordinate system.

It is a further object of the present invention to provide a search capability to find targets with known speeds that may have unexpectedly turned.

It is a further object of the present invention to provide a method for detecting and tracking maneuvering targets that does not require complete model characterization.

SUMMARY OF THE INVENTION

In accordance with the present invention, a maneuver detection method is disclosed. The method of the present invention does not require full model characterization, and the computational burden scales linearly as the number of radar scans increases. The method comprises the following steps. A first and second radar information of a maneuvering target are determined. The radar information comprises range, range rate, and time of observation. A set of target speeds is provided, wherein each target speed is not less than each of the range rates. A set of turn radii is determined using the set of target speeds and the first and second radar information. The set of target speeds and the set of turn radii define a speed-radius curve. A set of target arc speeds is provided. A second set of turn radii is determined using the set of target arc speeds and the first and second radar information. The set of target arc speeds and the second set of turn radii define a second arc speed-radius curve. An intersection of the curves is then located, providing an intersection speed and an intersection turn radius, which intersection is used to indicate that the target has made a turn. The time between first and second radar informations is used to validate the area where the curves intersect.

The target is assumed to be traveling at an approximately constant speed along an arc of a circle with an approximately constant turn radius, and the distance between a radar system and the center of the circle is not assumed to be constant. The set of turn radii is determined by using a geometrical relationship between the relative positions of the target and the position of a radar system. The second set of turn radii is determined by using another geometrical relationship between the relative positions of the target and the position of the radar system. Only the magnitudes of the radar information are used to describe the geometrical relationships, so that the determination of the sets of turn radii does not involve complicated vector-based calculations.

The position information may also include an azimuth measurement. When a radar tracking system is disposed in a moving vehicle, such as an aircraft, the distance between the radar system and the center of the circle is not constant. Therefore, when the radar system is disposed in a moving vehicle, the method further comprises the step of redetermining the first and second ranges to the target from a virtual observation point, utilizing azimuth measurements. The range rate and time measurements need not be redetermined.

DETAILED DESCRIPTION OF THE PREFERRED EMBODIMENT

In their most basic form, trajectories of maneuvering targets are composed of turns. Trajectories such as orbits, figure 8's, and weaves are composed of repeating turns with somewhat repeatable turn radii and approximately constant speed. The present invention discovers such turn radii and speed parameters and accumulates this data to detect and follow maneuvering targets. This method does not require full model characterization, and the computational burden scales linearly as the number of radar scans increases. The present invention does not directly rely on azimuth measurements, and does not define a target's position in relation to any coordinate system.

In an embodiment of the present method, a radar system is used to gather information of a target, which is contained in a radar report. The radar information includes a range, a range rate, and a time of the observation. Two radar reports are determined at two subsequent times. The radar information in the two reports is used to determine a set of turn radii. A turn radius is the radius of curvature of the turn defined by a geometrical distance between the target and the point about which the target is turning.

Figure 1:
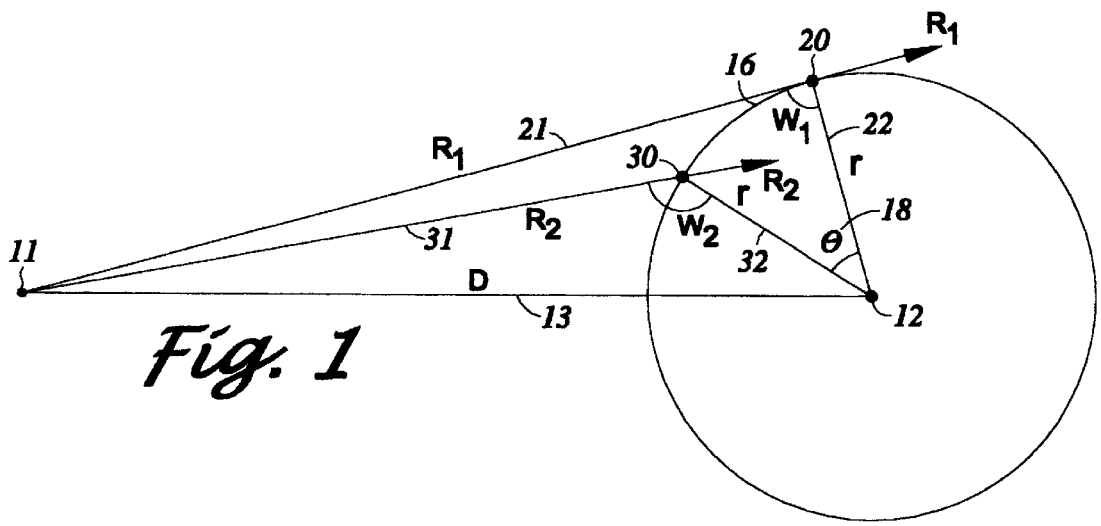
FIG. 1 illustrates relationships between a stationary radar system and a maneuvering target, which are used to determine sets of turn radii in accordance with an embodiment of the present invention.

Referring now to FIG. 1, geometrical relationships between the stationary radar system 11 and two positions of the target 20 and 30 are shown, where the target is making a turn. It is assumed that the target is turning at a constant turn radius and speed, and that the distance 13 between the radar system 11 and the center of the circle 12 is constant. A first triangle is described by a first range 21, a radius 22, and the distance 13 between the radar system 11 and the center of a turning circle 12. A second triangle is described by a second range 31, a radius 32, and the distance 13 between the radar system 11 and the center of a turning circle 12. These two triangles have two sides that are the same length, the distance D 13 and a radius r of the circle. These geometrical relationships can be described by the following:

$$D^2 = r^2 + R_1^2 - 2rR_1 \cos(w_1) = r^2 + R_2^2 - 2rR_2 \cos(w_2)$$

$$w = \pi/2 \pm \cos^{-1}(\dot{R}/S)$$

where S is a magnitude of the target's speed.
Solving for r, $$r = \left| \frac{R_2^2 - R_1^2}{2\left[\pm R_2(1-(\dot{R}_2/S)^2)^{\frac{1}{2}} \pm R_1(1-(\dot{R}_1/S)^2)^{\frac{1}{2}}\right]} \right| \quad \text{(Eq. 1)}$$

where $R_1$=the first range, $\dot{R}_1$=the first range rate, S=a magnitude of target speed,
$R_2$=the second range, $\dot{R}_2$=the second range rate, and r=a turn radius.

Substituting a hypothetical set or target speeds for S and solving for r yields a set of turn radii for the maneuvering target. Both the sum and difference need to be computed because it is not known on which part of the circle the target is traveling. Each of the set of target speeds must not be less than the range rates, as this is not possible and will lead to complex solutions. The set of turn radii and the set of target speeds define a speed-radius curve. The generation of the curve does not involve the direction of the target's motion in any coordinate system, such as North, East, and Down (NED) or Line of Sight (LOS), but uses only relative dimensions.

To determine which part of the speed-radius curve is plausible for the actual motion of the target, the elapsed time between the two radar reports is used. The distance the target travels along an arc of the circle 16 is a radius of the circle multiplied by the subtended angle (θ)18. This distance divided by the elapsed time between radar reports is the average speed of the target along the arc. This can be expressed as: S(arc)=rθ/Δt. Defining θ in terms of the radar information, $$S(\text{arc}) = r[\text{abs}(a \cos((D^2+r^2-R_1^2)/2Dr) \pm a \cos((D^2+r^2-R_2^2)/2Dr))]/\Delta t \quad \text{(Eq. 2)}$$

where $D = [r^2 + R_1^2 - 2rR_1(\pm(1-(\dot{R}_1/S)^2)^{1/2})]^{1/2}$, S=the predetermined set of possible speeds used in Equation 1, and Δt=an elapsed time between the radar reports. Substituting a predetermined set of target arc speeds for S(arc) and solving for r yields a second set of turn radii. The predetermined set of target arc speeds must not be less than the range rates, as this is not possible and will lead to complex solutions. The second set of turn radii and the set of target arc speeds defines an arc speed-radius curve. A speed-radius curve and a second arc speed radius curve can be seen in FIG. 2.

Figure 2:
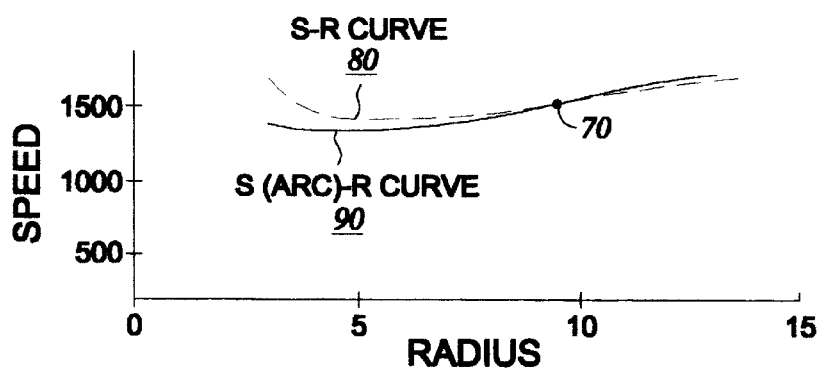
FIG. 2 shows an intersection of a speed-radius curve and an arc speed-radius curve.

The actual speed of the target will generate a certain radius when substituted for S in Equation 1. The actual arc speed of the target will generate a certain radius when substituted for S(arc) in Equation 2. The point on the curves where the difference between S and S(arc) is minimized, that is, where the curves intersect or come closest to intersecting, is the point where all the equation parameters are maximally consistent. FIG. 2 shows the curves plotted in a speed-radius space, with intersection 70. This intersection makes it possible to detect that the target has made a turn.

As an example of the present method, a target travels in a straight line with speed s, then makes an unanticipated turn in radar scan k. If the radar report from the target in scan k-1 was paired with all the radar reports in the gate in scan k, and a speed-radius curve and an arc speed-radius curve were generated for each pair, then the report that corresponds to the target's position in scan k would produce an intersection of the curves at speed s, the last known speed of the target. At most, only one report in scan k can belong to the target. It is very unlikely that other reports in the gate from scan k would produce an intersection in the right place in the speed-radius plot. This makes it possible to detect that the target has made a turn. Further radar reports can be paired to generate further curves. The speed and radius where the majority of these curves intersect will provide more evidence that the intersection is approximately the true speed and turn radius of the target. The turn radii and speed data generated by the method could be incorporated into a cost function of an expanded gate, or used as a parallel cost function in the event that no possible targets appear in the standard gate. Alternatively, this data could be used to prune possible branches if multiple hypothesis tracking algorithms are being used.

This embodiment of the present method may be enhanced by creating a window of interest defined by specific sets of speeds and radii. A particular target of interest may have only a few possible speeds and turning radii of interest. Any pair of radar reports can generate a speed-radius and an arc speed-radius curve to see if they fit speeds and radii of the target of interest. The method may further include the step of ignoring parts of the speed-radius and arc speed-radius curves that are outside such a window of interest.

This embodiment of the present method may also be enhanced by validating portions of the speed-radius and arc speed-radius curves by incorporating the times of the observations. Selecting a predetermined speed tolerance will create an area of the curves that will be considered valid for intersections with other curves.

Figure 3:
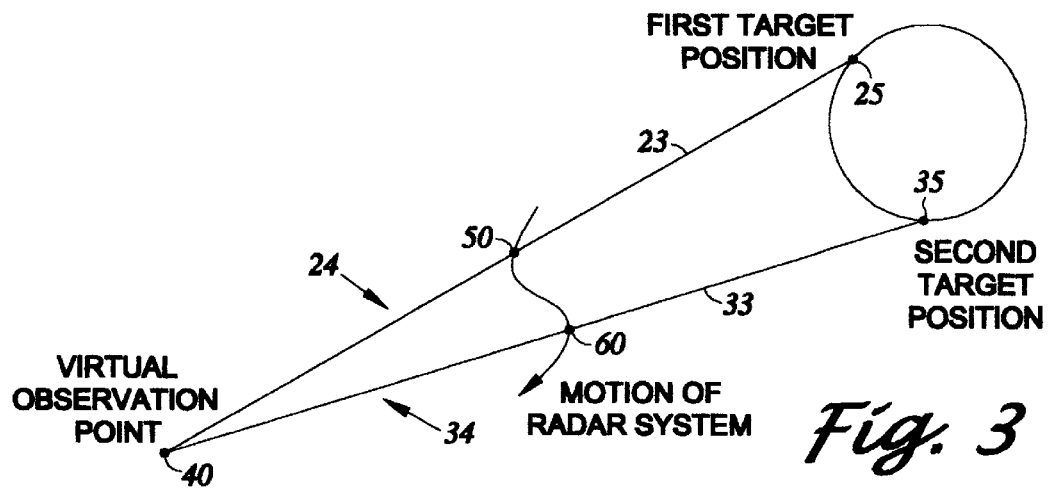
FIG. 3 illustrates relationships between a radar system that is disposed in a moving vehicle and a maneuvering target, which are used to determine set of turn radii in accordance with the preferred embodiment of the present invention.

In the preferred embodiment of the present method, the radar system is disposed in a vehicle that is moving, for example an aircraft. This means that the distance from the radar system to the center of the circle at the different times will not be constant. Therefore, a virtual observation point must be determined to utilize the present method. Referring now to FIG. 3, two positions 50,60 of the radar system disposed in a moving vehicle are shown. The two ranges 23 and 33 are extended beyond the radar system to a point where they intersect, virtual observation point 40. New ranges 24 and 34 are calculated using azimuth measurements determined as part of the position information. Azimuth errors contribute very little error to the redetermined ranges. The range rates and times do not need to be redetermined. The new ranges 24 and 34 are substituted in Equation 1 to yield a set of turn radii and thus a speed-radius curve. The new ranges are also substituted into Equation 2 to generate a second set of turn radii and thus an arc speed-radius curve. The method then proceeds as discussed above. In this preferred embodiment the intersection of the curves is located by using an accumulation array or histogram, although it is to be recognized that other methods of locating the intersection are possible and are within the scope of the present invention.

An important concern for any method for detecting maneuvering targets is its ability to reject evidence from clutter and unintended targets. The present method may be enhanced to address this problem by ignoring portions of the speed-radius and arc speed-radius curves that are horizontal. These are areas where almost any radius, including an infinite radius, can satisfy Equation 1 for a small range in speed. As target trajectories approach a straight line, corresponding speed-radius and arc speed-radius curves approach this horizontal condition. Intersections in this region of the curves may be rejected by qualifying the curves with their first derivative. Any curve whose slope is within some predetermined threshold around zero should be ignored.

In an ideal situation, where a target maintains perfectly constant speed and turning radius, and all measured parameters (range, range rate azimuth and time) are error free, the two curves described in FIG. 2 of the application will intersect in the correct place as advertised. However, in practice, all measurements have some error. The curves in FIG. 2 may not intersect and the point of closest intersection may be very sensitive to measurement errors, target speed and radius variations. This sensitivity is due to the tendency of these curves to be nearly parallel near their ideal intersection. For this reason, the region where these curves are near each other is best suited as the valid region to look for intersections formed by superimposing more curves formed by additional observations. If a third observation is included, another set of curves can be formed by pairing the second and the third observations and overlaying it on the curves formed by the first and second observations.

An important aspect of the present invention is its ability to detect targets where no targets are noticed by conventional methods. This is an extension of the paragraph above. Several scans of data can be processed in a batch, using observations paired in adjacent scans. The time-validated portion of each SR curve can be overlaid on the same plot. If there are maneuvering targets, their SR curves (validated using time) will intersect in nearly the same place. Accumulating the number of intersections in clusters on the plot will reveal the presence of maneuvering targets. This is particularly important if the detection probability is not 1 (where targets may not always appear in every scan) because it may take several scans to gather sufficient evidence to detect a track regardless of the method used. Conventional methods have difficulty evaluating the track likelihoods as the number of scans increases. Consider the number of possible combinations of data in successive scans that need to be evaluated as potential tracks. Given 1 report in scan 1 and m, n, p, q, and r reports in scans 2 through 6 respectively. The total number of possible combinations of reports that may be tracks equals m*n*p*q*r. The area (gate) of each successive scan must be widened to account for the distance the target can cover as time increases. As described herein, the search area grows as the square of the distance the target can travel. This means that the number of reports r may be significantly larger than q. It is not unusual for the product of these variables to exceed 10 to the 12 power for a radar trying to find a missile. In contrast, the SRT transform method only grows to equal: m+m*n+n*p+p*q+q*r. For example, if m, n, p. q, and r equal 3, 36, 81, 144, 225, the number of potential tracks evaluations equals 283, 435, 200 as compared to the SRT method that produces 47,091 curves.

It is to be understood that the described embodiments are merely illustrative of the many specific embodiments which represent applications of the present invention. Other embodiments may be readily devised by those skilled in the art without departing from the spirit and scope of the present invention.

What is claimed is:

1. A method for processing radar returns to detect the presence of a maneuvering target, comprising the steps of:
   a) receiving first radar information, which comprises a first range, a first range rate, and a first time;
   b) receiving second radar information, which comprises a second range, a second range rate, and a second time;
   c) providing a set of potential target speeds, wherein each of the set of target speeds is not less than the first range rate and not less than the second range rate;
   d) determining a set of turn radii, wherein each of the set of turn radii is defined by one of the set of potential target speeds and the first and second radar information, and wherein the set of turn radii and the set of potential target speeds define a speed-radius curve;
   e) providing a set of potential target arc speeds, wherein each of the set of potential target arc speeds is not less than the first range rate and not less than the second range rate;
   f) determining a second set of turn radii, wherein each of the second set of turn radii is defined by one of the set of potential target arc speeds and the first and second radar information, and where the second set of turn radii and the set of potential target arc speeds define an arc speed-radius curve;
   g) locating the point of minimal difference between the speed-radius curve and the arc speed-radius curve; and
   h) comparing the minimal difference between the speed radius curve and the arc speed radius curve to a predetermined window of interest indicative of the presence of a maneuvering target.

2. The method as recited in claim 1 further comprising the step of repeating steps a–h with respect to additional radar information to derive additional speed radius curves and arc speed radius curves, until an intersection thereof is detected.

3. The method of claim 2 wherein each of the set of turn radii is determined by $$r = \left| \frac{R_2^2 - R_1^2}{2\left[ \pm R_2\left(1 - (\dot{R}_2/S)^2\right)^{\frac{1}{2}} \pm R_1\left(1 - (\dot{R}_1/S)^2\right)^{\frac{1}{2}} \right]} \right|$$

where $R_1$=the first range, $\dot{R}_1$=the first range rate, S=one of the set of target speeds, $R_2$=the second range, $\dot{R}_2$=the second range rate, and r=a turn radius.

4. The method of claim 3 wherein each of the second set of turn radii is determined by $$S(\text{arc}) = r[\text{abs}(a \cos((D^2+r^2-R_1^2)/2Dr) \pm a \cos((D^2+r^2-R_2^2)/2Dr))]/\Delta t$$

where $D=[r^2+R_1^2-2rR_1(\pm(1-(\dot{R}_1/S)^2)^{1/2})]^{1/2}$, S(arc)=one of the set of target arc speeds, and $\Delta t$=a difference between the first time and the second time.

5. The method of claim 1 further comprising the step of ignoring portions of the speed-radius and arc speed-radius curves that fall outside the predetermined window of interest, wherein the predetermined window of interest is defined by a predetermined set of speeds of interest and a predetermined set of turn radii of interest.

6. The method of claim 1 further comprising the step of ignoring portions of the speed-radius curve and the arc speed-radius curve where slopes of the curves are within a predetermined threshold around zero.

7. The method of claim 1 wherein the first and second position information further comprises a first azimuth and a second azimuth; and further comprising the step of redetermining the first and second ranges using the first and second azimuths, wherein the redetermined ranges are distances from a virtual observation point to the target.

8. The method of claim 7 wherein each of the set of turn radii is determined by:

$$r = \left| \frac{R_{2new}^2 - R_{1new}^2}{2\left[ \pm R_{2new}\left(1 - (\dot{R}_2/S)^2\right)^{\frac{1}{2}} \pm R_{1new}\left(1 - (\dot{R}_1/S)^2\right)^{\frac{1}{2}} \right]} \right|$$

where $R_{1new}$=the redetermined first range, $\dot{R}_1$=the first range rate, S=one of the set of target speeds, $R_{2new}$=the redetermined second range, $R_2$=the second range rate, and r=a turn radius.

9. The method of claim 7 wherein each of the second set of turn radii is determined by:

$$S(\text{arc}) = r[\text{abs}(a \cos((D^2+r^2-R_{1new}^2)/2Dr) \pm a \cos((D^2+r^2-R_{2new}^2)/2Dr))]/\Delta t$$

where $D=[r^2+R_{1new}^2-2rR_{1new}(\pm(1-(\dot{R}_1/S)^2)^{1/2})]^{1/2}$, S(arc)= one of the set of target arc speeds, and $\Delta t$=a difference between the first time and the second time.

10. A method for tracking and detecting a turn of a maneuvering target comprising the steps of:
   a) determining a target radar report, including a known speed;
   b) determining a plurality of second radar reports;
   c) pairing the target radar report with each of the plurality of second radar reports to form report pairs;
   d) providing a set of target speeds;
   e) determining a set of turn radii for each report pair, wherein each of the set of turn radii is determined using one of the set of target speeds and one of the report pairs, wherein the set of turn radii for each report pair and the set of target speeds define a speed-radius curve for each report pair;
   f) providing a set of target arc speeds;
   g) determining a second set of turn radii for each report pair, wherein each of the second set of turn radii is determined using one of the set of target arc speeds and one of the report pairs, wherein the second set of turn radii for each report pair and the set of target arc speeds define an arc speed-radius curve for each report pair;
   h) locating a solution report pair, the solution report pair being an intersection of at least one of the speed-radius curves and at least one of the arc speed-radius curves at the known speed; and
   i) using the solution report pair to detect whether the target has made a turn.

11. The method of claim 10 wherein the target radar report further comprises a first range, a first range rate, and a first time; and wherein each of the plurality of second radar reports comprises a second range, a second range rate, and a second time.

12. The method of claim 11 wherein each of the set of turn radii for each radar report is determined by $$r = \left| \frac{R_2^2 - R_1^2}{2\left[ \pm R_2 \left(1 - (\dot{R}_2/S)^2\right)^{\frac{1}{2}} \pm R_1 \left(1 - (\dot{R}_1/S)^2\right)^{\frac{1}{2}} \right]} \right|$$

where $R_1$=the first range, $\dot{R}_1$=the first range rate, S=one of the set of target speeds, $R_2$=the second range, $\dot{R}_2$=the second range rate, and r=a turn radius.

13. The method of claim 12 wherein each of the second set of turn radii for each radar report is determined by $$S(\text{arc}) = r[\text{abs}(a \cos ((D^2+r^2-R_1^2)/2Dr) \pm a \cos ((D^2+r^2-R_2^2)/2Dr))]/\Delta t$$

where $D=[r^2+R_1^2-2rR_1(\pm(1-(\dot{R}_1/S)^2)^{1/2})]^{1/2}$, S(arc)=one of the set of target arc speeds, and $\Delta t$=a difference between the first time and the second time.

14. The method of claim 10 further comprising the step of ignoring portions of the speed-radius and arc speed-radius curves that fall outside a predetermined window of interest, wherein the window of interest is defined by a predetermined set of target speeds of interest and a predetermined set of turn radii of interest.

15. The method of claim 10 further comprising the step of ignoring portions of the speed-radius curves and the arc speed-radius curves where slopes of the curves are within a predetermined threshold around zero.

* * * * *